Jan. 25, 1966  A. T. BLAKE  3,231,212
SELF-LOCKING CORE CHUCKS
Filed Aug. 8, 1963  2 Sheets-Sheet 1

INVENTOR
ARTHUR T. BLAKE
BY
ATTORNEY.

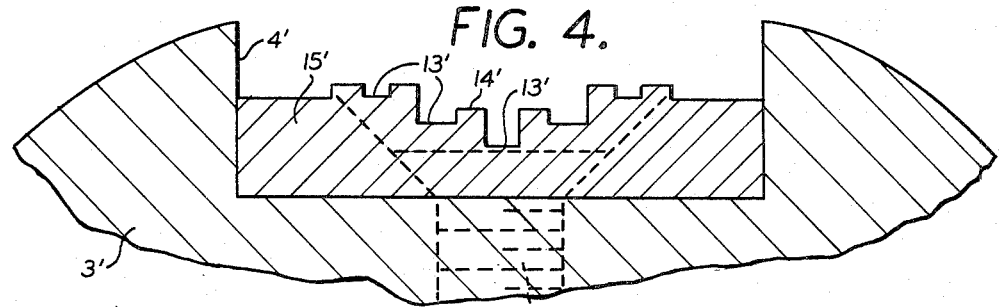
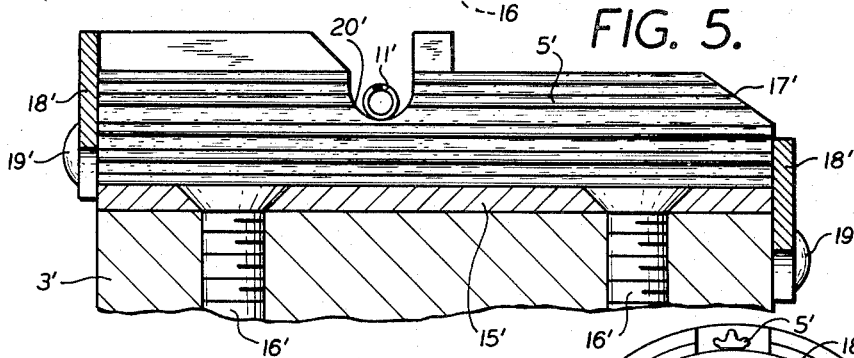
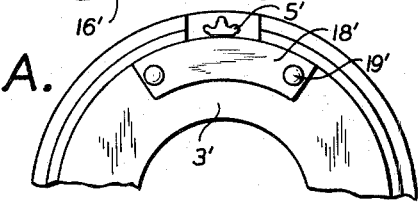
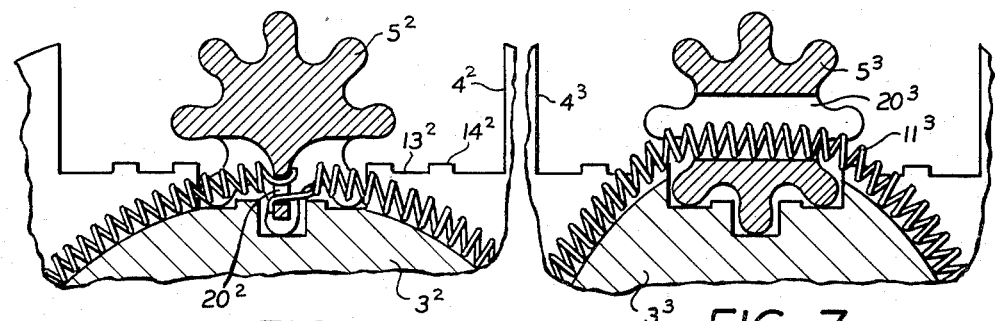
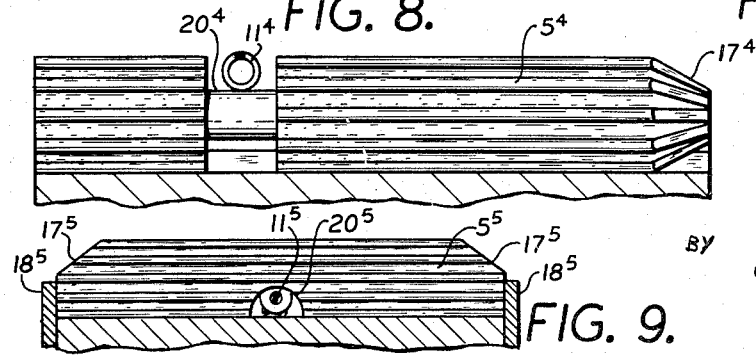
INVENTOR
ARTHUR T. BLAKE 3,231,212
SELF-LOCKING CORE CHUCKS
Arthur T. Blake, 57 Ilford Ave., North Arlington, N.J.
Filed Aug. 8, 1963, Ser. No. 300,841
6 Claims. (Cl. 242—68.2)

The present invention relates to self-locking and self-adjusting core chucks for winding and unwinding rolls of various materials, such as webs, films or foils which, while being processed or used, are wound into or unwound from rolls having a hollow, cylindrical core, usually made of cardboard. In handling of such materials, a spindle or shaft is passed through the core and so-called core chucks are employed to lock the core to the spindle or shaft.

In applicant's own prior Patent No. 3,022,959, dated February 27, 1962, a core chuck, designed to lock the core of a roll of material during winding and unwinding operations to a mandrel, is disclosed, which comprises a tubiform cylindrical chuck body dimensioned to accomodate a core and which also includes means for fastening the chuck body onto a mandrel shaft, the chuck body defining on the surface opposite the core a recess disposed parallel to the rotating axis thereof. The recess has a terraced bottom including at least one step ascending from a common center groove to each side of the recess. The faces of the step and of the common center groove are substantially parallel to and spaced apart at different distances from the opposite smooth face of the core. A toothed roller is arranged in the recess with its axis parallel to the axis of the chuck body. The roller has an overall diameter slightly in excess of the greatest depth of the recess with one tooth resting on the bottom of the common center groove and an opposing tooth adapted to bite in the opposite face of the core to form a pivot point for turning of the roller. A tooth adjacent to the one tooth being adapted to mount the step adjacent the common center groove in response to a lateral force acting upon at least the opposing tooth of the roller and finally spring means are arranged for returning the roller into the lowermost position in the recess upon cessation of the lateral force.

It has been found, however, that under certain conditions, the toothed roller assumes positions which are not exactly parallel to the chuck axis as it rises from one step to the next, which interferes with the proper operation of the self-locking core chuck, and in addition, it has also been found that under these circumstances the toothed roller slips axially even under the severe stresses involved in locking the core.

It is, therefore, one object of the present invention to provide self-locking core chucks, which include means for keeping the toothed roller constantly parallel to the chuck axis as it rises.

It is another object of the present invention to provide self-locking core chucks, which include means preventing an axial slippage of the toothed roller even under the severe stresses involved in locking the core.

It is still another object of the present invention to provide self-locking core chucks, wherein the chuck body has a recess disposed parallel to the rotating axis thereof and a terraced bottom formed in the recess by a separate member releasably and exchangeably secured to the chuck body.

With these and other objects in view, which will become apparent in the following detailed description, the present invention will be clearly understood in connection with the accompanying drawings, in which:

FIG. 4 is a schematic section of a terraced bottom provided in a recess arranged in the chuck body, constituting another embodiment of this structure;

FIG. 5 is a longitudinal section of the chuck body following the embodiment disclosed in FIG. 4;

FIG. 5A is an end view of the structure shown in FIG. 5;

FIG. 6 is a cross-section of still another embodiment of a chuck body;

FIG. 7 is a cross-section of a further embodiment of a chuck body;

FIG. 8 is an elevation of another embodiment of a toothed roller; and

FIG. 9 is an elevation of still another embodiment of a toothed roller.

Figure 1:
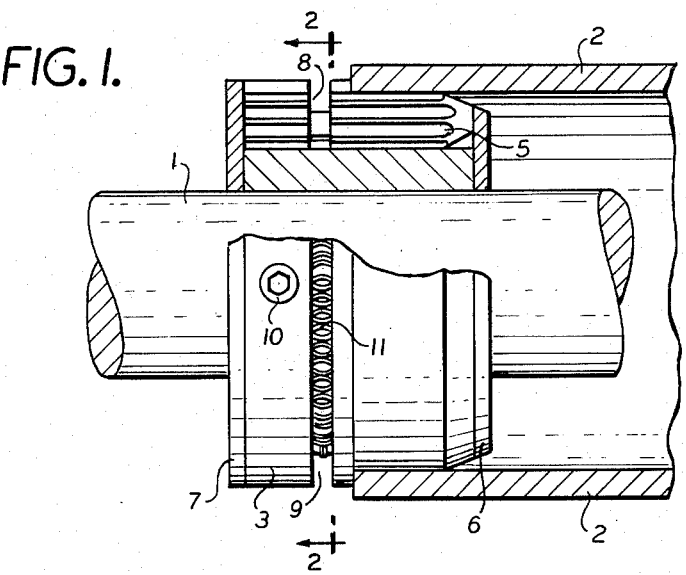
FIGURE 1 is a partly sectional side view of the self-locking core chuck.

Referring now to the drawings, the self-locking core chuck comprises a mandrel shaft 1 inserted into a core 2, which may be, for example, one of the cardboard cores used for the winding and unwinding of rolls of various materials. Two such core chucks of predetermined size are fastened to the shaft 1 and in particular, one at each end of the core 2. The core chucks are formed of hollow, cylindrical bodies 3, which can be machined down at least at one end to short, truncated cones in order to facilitate insertion of the chucks into the core 2 up to a rear shoulder of somewhat larger diameter, though such shoulder can be omitted, in order to permit a sliding through of the core chucks.

Figure 2:
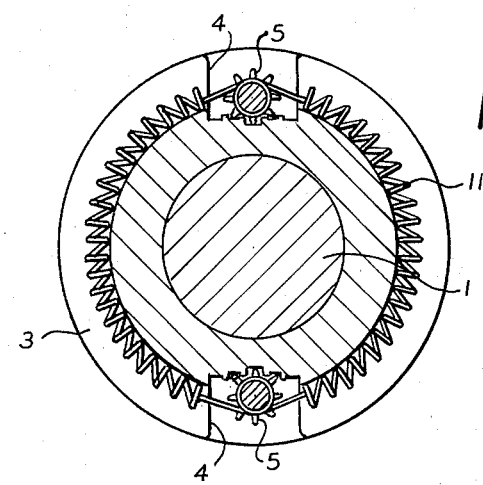
FIG. 2 is a sectional view along the lines 2—2 of FIG. 1.

As shown in FIG. 2 of the drawings, one or more, but preferably three peripheral and co-axial recesses 4 are cut longitudinally into the chuck body, though only two such recesses 4 are shown in FIG. 2, whereby the bottom of each of the recesses 4 is terraced in form of opposite stairs descending toward a common bottom groove.

Inserted into each of the recesses 4 is a toothed roller 5, which, preferably, is of the same length as the chuck body, to fit closely, but freely rotatably, between a front retainer ring 6 and a rear retainer ring 7. The toothed roller 5 is, preferably, provided with at least one truncated conical end, to fit peripherally flush against the edge of the front retainer ring 6. Furthermore, the toothed roller 5 is provided with a neck journal 8, which is lined up with a groove 9 cut into the surface of the chuck body perpendicularly to its axis. A set screw 10 extending radially through the hollow cylindrical body 3 locks the core chuck to the mandrel shaft.

The diameter of the toothed roller 5 is selected to slightly exceed the greatest depth of the peripheral recess 4. Accordingly, when the toothed roller 5, held by a helical spring 11, is at rest with one of the teeth positioned within the center groove of the recess 4, the uppermost tooth of the toothed roller 5 projects just about beyond the periphery of the chuck body and only a relatively light effort is needed to insert the chuck within the core 2. Most of this light effort is expended to produce an intimate contact between the rim of this tooth and the inner surface of the core 2. Thus, the uppermost tooth of the toothed roller 5 should penetrate slightly into the inner face of the cardboard core 2 upon insertion of the chuck or make at least sufficient contact with the cardboard core 2 to be forced along by any rotational movement of the core 2 with respect to the mandrel shaft 1 and the core chuck. If this is the case, the toothed roller 5 which, while being held by the helical spring 11 and until now rested with its lowermost tooth against the bottom groove of the recess 4, is forced into ascending the stairs in the direction of the rotary movement of the core 2, or it is forced to mount the stairs in the opposite direction of the rotary movement of the mandrel shaft 1, depending whether the rotational movement originates with the core 2 or with the mandrel shaft 1. As a result, the uppermost tooth of the toothed roller 5 penetrates into the cardboard core 2 to the extent of ascend upon the stairs and a substantially unbreakable contact between the cardboard core 2 and the mandrel shaft 1 is produced, permitting winding and unwinding operations, respectively, at a high speed and in the presence of a heavy rotary pull on the part of the mandrel shaft 1 or of a lateral pull of the same exerted upon the web.

It is quite apparent and it is a particular advantage of the present invention, that this intimate contact between the core 2 and the mandrel shaft 1 can be broken the moment the winding or unwinding operation comes to a rest. A slight rotational movement of either the core 2 or of the mandrel shaft 1 in the opposite direction to that of the direction of rotation, causes the toothed roller 5 to descend into its rest position within the bottom groove. This movement is aided by one or more springs which up to this moment had been under increased tension.

Since the toothed rollers 5 are retained within peripheral recesses of the chuck body which are terraced in the form of opposite stairs, it is evident that, upon using chucks, as described above, a winding operation can be immediately followed by an unwinding operation, or vice versa, without the necessity of reversing the chucks.

It is, of course, one requirement of the present structure, that the height and width of the steps of the terraced bottom of the recess be correlated to the diameter of the toothed roller 5 and to the number and shape of the teeth thereof.

The present invention has as its particular feature likewise a terraced bottom 12 in the peripheral and coaxial recesses 4 which are cut longitudinally into the chuck body and there are also opposite stairs provided in each of the recesses toward a common bottom groove. Yet, in addition to the structure disclosed in said applicant's prior Patent No. 3,022,959, dated February 27, 1962, the terraced bottom 12 is equipped at each step of the stairs with raised ribs 14, which receive the teeth of the toothed rollers 5 and retain the latter constantly in a position parallel to the chuck axis as the toothed roller 5 rises on the stairs 13. Due to the fact that the teeth of the toothed roller 5 enter the spaces between the raised ribs 14 during its rise on the stairs, a slippage of the toothed roller 5 in axial direction, even under severe stresses involved in locking the core, is prevented.

It has been found that such arrangement provides a safer operation of the self-locking core chuck and avoids clearly and efficiently the drawbacks and possible disadvantages of the arrangement of said applicant's prior patent, at least under certain circumstances.

Figure 3:
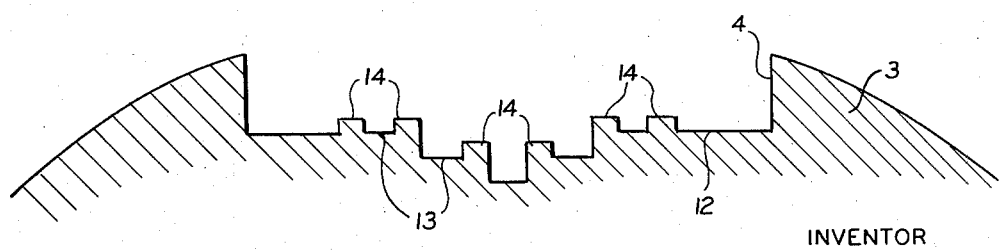
FIG. 3 is a schematic section of a terraced bottom provided in a recess arranged in the chuck body on the surface opposite the core.

Referring now again to the drawings, and in particular to FIGS. 4, 5 and 5A, another embodiment of the structure shown in FIG. 3 is disclosed, which again comprises a hollow cylindrical body 3' which has recesses 4' and is equipped with a removable insert 15' secured to the hollow cylindrical body 3' by means of screw bolts 16'.

FIG. 5 shows also a toothed roller 5' resting on the removable terraced insert 15', which has the stairs 13' and raised ribs 14'. The toothed roller 5' has a bevel 17' at one end and is retained by end plates 18' secured to the end faces of the hollow cylindrical body 3' by means of screw bolts 19'. A helical spring 11' urges the toothed roller 5' into its lowest position on the terraced bottom of the recess 4'. A groove 20', extending at least over a portion of the periphery of the toothed roller 5', receives the spring 11' in the embodiment of FIG. 5.

Referring now to FIG. 6, a different connection of the spring to the toothed roller is disclosed. The structure comprises substantially a cylindrical body $3^2$ having peripheral recesses $4^2$ in which a terraced bottom is provided to form the stairs $13^2$ having raised ribs $14^2$. A toothed roller $5^2$ sits on the terraced bottom and one tooth of the toothed roller $5^2$ has a crosswise disposed hole $20^2$ extending therethrough in which hole $20^2$ the ends of a helical spring $11^2$ are removably secured.

FIG. 7 discloses an embodiment in which the cylindrical body $3^3$ forms again in a terraced bottom in a recess $4^3$. A toothed roller $5^3$ sits on the terraced bottom and is equipped with a bore $20^3$ extending across the longitudinal axis of the toothed roller $5^3$. A helical spring $11^3$ extends through the bore $20^3$ and surrounds the cylindrical body $3^3$ in the manner set forth above, in order to hold down the toothed roller $5^3$ in the terraced bottom.

FIG. 8 discloses a toothed roller $5^4$ having an annular groove $20^4$ intermediate its ends to receive a helical spring $11^4$ therein. One end of the toothed roller $5^4$ has, preferably, a bevel $17^4$ in order to facilitate the sliding on of the cardboard core.

FIG. 9 shows an embodiment of a toothed roller $5^5$ having a bevel $17^5$ at both ends thereof and a helical spring $11^5$ extends through a lateral bore $20^5$ of the toothed roller $5^5$. In this embodiment it is preferable to provide end plates $18^5$ in order to prevent any axial movement of the toothed roller $5^5$.

While I have disclosed several embodiments of the present invention, it is to be understood that these embodiments are given by example only and not in a limiting sense, the scope of the present invention being determined by the objects and the claims.

I claim:

1. A core chuck designed to lock the core of a roll of material winding and unwinding operations to a mandrel, said core chuck comprising a core, a tubiform cylindrical chuck body dimensioned to accommodate said core, means for fastening said chuck body onto a mandrel shaft, said chuck body defining on the surface opposite said core at least one recess disposed parallel to the rotating axis thereof, said recess having a terraced bottom including at least one step ascending from a common center groove to each side of said recess, the top faces of said step and of said common center groove being substantially parallel to and spaced apart at different distances from the opposite smooth face of said core, at least one toothed roller disposed in said recess with its axis parallel to the axis of said chuck body, the top face of each of said steps having two raised ribs spaced apart from each other to define an axially disposed groove therebetween, and receiving the corresponding tooth of said toothed roller, in order to prevent an axial movement and an inclined position of the latter, said toothed roller having an outer diameter slightly in excess of the greatest depth of said recess with one tooth resting on the bottom of said center groove and an opposing tooth adapted to bite into the opposite face of said core to form a pivot point for a turning of said roller, a tooth adjacent to said one tooth adapted to mount said step adjacent said common center groove and to enter said grooves between said raised ribs in response to a lateral force acting upon at least said opposing tooth of said toothed roller, and resilient means engaging said toothed roller to return said roller into the lowermost position in said recess upon cessation of said lateral force.

2. The core chuck, as set forth in claim 1, wherein said resilient means comprises a helical spring engaging said toothed roller, and the latter has a peripheral groove disposed in a plane perpendicular to the longitudinal axis of said toothed roller and extending at least for a portion of its periphery.

3. The core chuck, as set forth in claim 2, wherein one of the teeth of said toothed roller has a hole receiving and securing the ends of said helical spring to said toothed roller.

4. The core chuck, as set forth in claim 2, wherein
said toothed roller has a bore disposed crosswise through the longitudinal axis thereof, and
said helical spring extends through said bore.

5. The core chuck, as set forth in claim 1, wherein
at least one end of said toothed roller has a bevel in order to permit mounting a cardboard core on the core chuck.

6. The core chuck, as set forth in claim 1, which includes
end plates releasably secured to the end faces of said core chuck spaced apart from its periphery to overlap said toothed roller inserted in said recess of said chuck body, in order to prevent an axial movement of said toothed roller.

References Cited by the Examiner

UNITED STATES PATENTS

| | | | |
|---|---|---|---|
| 1,122,627 | 12/1914 | Milne | 242—72 |
| 1,437,120 | 11/1922 | Stephenson | 192—44 |
| 1,867,938 | 7/1932 | Dalton | 192—43 |
| 2,526,565 | 10/1950 | Kennard | 287—52.09 |
| 2,565,961 | 8/1951 | Godfrey | 192—43 |
| 2,798,678 | 7/1957 | Dadd | 242—72 |
| 2,833,488 | 5/1958 | Kerber | 242—68.3 |
| 3,022,959 | 2/1962 | Blake | 242—72 |
| 3,085,820 | 4/1963 | Pollia | 287—53 |

FOREIGN PATENTS 1,240,698   8/1960   France.

JORDAN FRANKLIN, *Primary Examiner.*